United States Patent
Seed et al.

(10) Patent No.: US 11,350,151 B2
(45) Date of Patent: May 31, 2022

(54) METHODS, SYSTEMS AND DEVICES THAT ENABLE A USER OF A MOBILE PHONE TO SELECT WHAT CONTENT IS DISPLAYED ON A SCREEN OF A CONSUMER ELECTRONIC DEVICE ON DISPLAY

(71) Applicant: OnQ Solutions, Inc., Hayward, CA (US)

(72) Inventors: Jason C. Seed, Woodside, CA (US); Paul F. Chapuis, Woodside, CA (US); Kenneth Todd Reed, Calgary (CA); Pavol Galvoič, Bratislava (SK)

(73) Assignee: OnQ Solutions, Inc., Hayward, CA (US)

( * ) Notice: Subject to any disclaimer, the term of this patent is extended or adjusted under 35 U.S.C. 154(b) by 0 days.

(21) Appl. No.: 17/245,609

(22) Filed: Apr. 30, 2021

(65) Prior Publication Data
US 2022/0095006 A1 Mar. 24, 2022

Related U.S. Application Data

(60) Provisional application No. 63/083,050, filed on Sep. 24, 2020.

(51) Int. Cl.
| | |
|---|---|
| *H04N 21/41* | (2011.01) |
| *H04N 21/81* | (2011.01) |
| *H04N 21/422* | (2011.01) |
| *H04N 21/478* | (2011.01) |

(52) U.S. Cl.
CPC . *H04N 21/41265* (2020.08); *H04N 21/42204* (2013.01); *H04N 21/47815* (2013.01); *H04N 21/8173* (2013.01); *H04N 21/8186* (2013.01)

(58) Field of Classification Search
CPC .......... H04N 5/23203; H04N 5/23219; H04N 7/147; H04N 7/157; H04N 21/41415; H04N 21/8358
See application file for complete search history.

(56) References Cited

U.S. PATENT DOCUMENTS

2018/0165670 A1* 6/2018 Bacallao .............. G07G 1/0036
2021/0365925 A1 11/2021 Nemirovsky et al.

OTHER PUBLICATIONS

Bevi, "Water dispensers—Frequently asked questions," downloaded from https://www.bevi.co/support/frequently-asked-questions/ on Apr. 30, 2021, 11 pages.
U.S. Appl. No. 63/027,408, filed May 20, 2020, by Nemirovsky.

* cited by examiner

*Primary Examiner* — Samira Monshi
(74) *Attorney, Agent, or Firm* — Vierra Magen Marcus LLP

(57) ABSTRACT

Described herein are methods, systems, and devices for enabling a user of a mobile phone to use the mobile phone to select what content is displayed on a display screen of a consumer electronic device (e.g., a television) on display in a retail store. A scannable code (e.g., a QR code) is caused to be displayed on the display screen of the consumer electronic device, and a session with the mobile phone is established in response to the mobile phone being used to scan the scannable code that is displayed on the display screen of the consumer electronic device. A GUI, which is displayed on the mobile phone during the session, enables a user of the mobile phone to select, using the mobile phone, which one of a plurality of options is displayed on the display screen of the consumer electronic device that is on display in the retail store.

23 Claims, 13 Drawing Sheets

QLED HUB CONTROL

⟨ BACK

What would you like to see?

See the difference

Explore the features

Hear the experience

Compare size & space

FIG. 8

Select up to 3 models to compare

65" Class Q800T QLED 8K UHD HDR Smart TV (2020) $3,199.99

55" Class Q70T QLED 4K UHD HDR Smart TV (2020) $999.99

49" Class Q80T QLED 4K UHD HDR Smart TV (2020) $1,099.99

55" Class Q90T QLED 4K UHD HDR Smart TV (2020) $1,699.99

65" Class Q900TS QLED 8K UHD HDR Smart TV (2020) $4,999.99

32" Class Q50R QLED Smart 4K UHD TV (2019)

METHODS, SYSTEMS AND DEVICES THAT ENABLE A USER OF A MOBILE PHONE TO SELECT WHAT CONTENT IS DISPLAYED ON A SCREEN OF A CONSUMER ELECTRONIC DEVICE ON DISPLAY

PRIORITY CLAIM

This patent application claims priority to U.S. Provisional Patent Application No. 63/083,050, filed Sep. 24, 2020, which is incorporated herein by reference.

BACKGROUND

When various different makes and models of televisions (TVs), or other consumer electronic devices including display screens, are displayed for sale within a retail store, the TVs often show consumers the same video in a loop. This arguably enables consumers (aka users) to view and compare the picture quality of the various different TVs. However, a consumer typically does not have the option of changing what is being shown on all of the TVs, or on an individual one of the TVs. Thus, if a consumer is primarily interested in purchasing a TV to view fast paced sports, the consumer may be frustrated if a relatively static image of a landscape is what is being displayed on the various TVs. Additionally, while standing in front of a wall of TVs in the retail store, it is often difficult for the consumer to obtain additional information about individual ones of TVs, such as the pixel resolution, refresh rate, dimensions, number of HDMI ports, customer reviews, expert reviews, and/or the like. Some of this information may be presented on a placard or place card that is provided by the retailer. However, the information on such a placard or place card may be difficult to read, e.g., if one or more of the TVs and the placards or place cards is/are mounted high on a wall. Additionally, the information included on such a placard or place card is often quite limited, and may not include the specific information of interest to the specific consumer.

BRIEF SUMMARY

Certain embodiments of the present technology related to methods, systems, and devices for enabling a user of a mobile phone to use the mobile phone to select what content is displayed on a display screen of a consumer electronic device that is on display in a retail store, wherein the consumer electronic device is not the mobile phone. In accordance with certain embodiments, the consumer electronic device comprises a television that is on display in the retail store. In accordance with certain embodiments, a method comprises: causing a scannable code to be displayed on the display screen of the consumer electronic device, wherein the scannable code is displayed based on scannable code data. The scannable code data can be, for example, Quick Response (QR) code data and the scannable code that is displayed on the display screen of the consumer electronic device can be a QR code. The method also comprises initiating a session with the mobile phone in response to the mobile phone being used to scan the scannable code (e.g., QR code) that is displayed on the display screen of the consumer electronic device, wherein the session is associated with the consumer electronic device that had displayed the scannable code that was scanned using the mobile phone. The method additionally comprises causing a graphical user interface (GUI) to be displayed on the mobile phone during the session, wherein the GUI enables a user of the mobile phone to select, using the mobile phone, which one of a plurality of options is displayed on the display screen of the consumer electronic device, e.g., a television (TV), that is on display in the retail store.

In certain such embodiments, the method includes enabling installing of a content presentation application on the consumer electronic device or on a media player that is communicatively coupled to the consumer electronic device. The content presentation application enables the scannable code to be displayed on the display screen of the consumer electronic device. In certain embodiments, the content presentation application also enables the GUI to be displayed on the mobile phone during the session. In certain embodiments, enabling installing of the content presentation application on the consumer electronic device or on a media player that is communicatively coupled to the consumer electronic device, comprises making the content presentation application available for download to the consumer electronic device or to a media player that is communicatively coupled to the consumer electronic device, or making the content presentation application available to a vendor of the consumer electronic device or of a media player that can be communicatively coupled to the consumer electronic device, so that the content presentation application can be preinstalled by the vendor on the consumer electronic device or on a media player that can be communicatively coupled to the consumer electronic device.

In accordance with certain embodiments, a content server provides the scannable code data to the consumer electronic device or to a media player that is communicatively coupled to the consumer electronic device, and the session with the mobile phone is between the mobile phone and the content server. In such an embodiment, initiating the session with the mobile phone (in response to the mobile phone being used to scan the scannable code that is displayed on the display screen of the consumer electronic device), comprises the content server providing the mobile phone with a link to a webpage that enables a browser installed on the mobile phone to display the GUI. In other embodiments, a content presentation application (installed on the consumer electronic device or a media player communicatively coupled thereto) generates the scannable code data and uses the scannable code data to display the scannable code. In such an embodiment, the session with the mobile phone is between the mobile phone and the content presentation application. In certain such embodiments, the content presentation application provides the mobile phone with a link to a webpage that enables a browser installed on the mobile phone to display the GUI.

In accordance with certain embodiments, the GUI, which is displayed via the browser installed on the mobile phone, includes one or more menus of options from which a user of the mobile phone can select to control what is being displayed on the display screen of the consumer electronic device. A further option that can be selected via the GUI causes information about the consumer electronic device to be sent to the user of the mobile phone via a text or email. Alternatively, or additionally, a further option that can be selected via the GUI causes the mobile phone to call or establish a textual chat with a representative of a manufacturer of the consumer electronic device, or with a representative of the retail store.

In accordance with certain embodiments, during the session, data indicative of which one or more options are selected by the user of the mobile phone is provided from the mobile phone to a content server over a cellular network that provides communication capabilities for the mobile phone.

The GUI that is displayed on the mobile phone is provided to the mobile phone via one or more web page links that are provided to the mobile phone over the cellular network. Content that is to be displayed on the consumer electronic device is provided to the consumer electronic device, or a media player that is communicatively coupled to the consumer electronic device, via one or more web page links. In accordance with alternative embodiments, during the session, data indicative of which one or more options are selected by the user of the mobile phone is provided from the mobile phone to the content presentation application. The GUI that is displayed on the mobile phone is provided to the mobile phone via one or more web page links that are provided to the mobile phone by the content presentation application. Content that is to be displayed on the consumer electronic device is provided based on image or video files that are stored in memory of consumer electronic device, or in memory of a media player that is communicatively coupled to the consumer electronic device.

In accordance with certain embodiments, the method further comprises terminating the session after a specified amount of time since the session started, or after a specified amount of time since any one of the options was last selected via the mobile phone.

In accordance with certain embodiments, the consumer electronic device, or a media player that is communicatively coupled to the consumer electronic device, acts as a master device that is used to at least partially control one or more slave devices, and the method further comprising enabling the user of the mobile phone to control what is being displayed on at least one additional consumer electronic device using the GUI to thereby enable the user to make comparisons between the consumer electronic device and the at least one additional consumer electronic device, wherein the at least one additional consumer electronic device, or media player(s) communicatively coupled thereto, is/are the one or more slave devices that is/are at least partially controlled by the master device.

Certain embodiments of the present technology are directed to at least one non-transitory processor readable storage device having processor readable code embodied thereon, the processor readable code for programming one or more processors to perform a method for enabling a user of a mobile phone to use the mobile phone to select what content is displayed on a display screen of a consumer electronic device that is on display in a retail store, the method comprising: causing a scannable code to be displayed on the display screen of the consumer electronic device, wherein the scannable code is displayed based on scannable code data; initiating a session with the mobile phone in response to the mobile phone being used to scan the scannable code that is displayed on the display screen of the consumer electronic device, wherein the session is associated with the consumer electronic device that had displayed the scannable code that was scanned using the mobile phone; and causing a GUI to be displayed on the mobile phone during the session, wherein the GUI enables a user of the mobile phone to select which one of a plurality of options is displayed on the display screen of the consumer electronic device that is on display in the retail store.

Certain embodiments of the present technology are directed to a system for enabling a user of a mobile phone to use the mobile phone to select what content is displayed on a display screen of a consumer electronic device that is on display in a retail store, wherein the consumer electronic device is not the mobile phone. Such a system can comprise a media player that is communicatively coupled to the consumer electronic device via a wired and/or wireless connection, as well as a content server that is communicatively coupled to the media player at least in part via the Internet. The media player includes a content presentation application installed thereon, which configures the media player to cause a scannable code to be displayed on the display screen of the consumer electronic device, wherein the scannable code is displayed based on scannable code data that is provided to the media player by the content server. The content server is configured to establish a session with the mobile phone in response to the mobile phone being used to scan the scannable code that is displayed on the display screen of the consumer electronic device, wherein the session is associated with the consumer electronic device that had displayed the scannable code that was scanned using the mobile phone. The content server is also configured to cause a GUI to be displayed on the mobile phone during the session, wherein the GUI enables a user of the mobile phone to select, using the mobile phone, which one of a plurality of options is displayed on the consumer electronic device that is on display in the retail store.

In accordance with certain embodiments, the content server is configured to cause the GUI to be displayed on the mobile phone during the session by providing the mobile phone with a link to a webpage that enables a browser installed on the mobile phone to display the GUI. In accordance with certain embodiments, the GUI, which is displayed via the browser installed on the mobile phone, includes one or more menus of options from which a user of the mobile phone can select to control what is being displayed on the display screen of the consumer electronic device. In accordance with certain embodiments, the content server is configured to receive data (indicative of which one or more options that are selected by the user of the mobile phone) over a cellular network that provides communication capabilities for the mobile phone. The content server is also configured to cause the GUI to be displayed on the mobile phone by providing the mobile phone with one or more web page links over the cellular network. In certain such embodiments, content that is to be displayed on the consumer electronic device, in response to one or more options being selected by the user of the mobile phone via the GUI, is provided to the media player that is communicatively coupled to the consumer electronic device, via one or more further web page links.

Certain embodiments of the present technology are directed to a consumer electronic device, comprising a display screen and at least one processor, wherein the at least one processor is configured to (e.g., via a content presentation application installed on the consumer electronic device) cause a scannable code to be displayed on the display screen of the consumer electronic device, establish a session with the mobile phone in response to the mobile phone being used to scan the scannable code that is displayed on the display screen of the consumer electronic device, and cause a GUI to be displayed via a browser installed on the mobile phone during the session. The GUI enables a user of the mobile phone to select which one of a plurality of options is displayed on the display screen of the consumer electronic device. In certain embodiments, the GUI, which is displayed via the browser installed on the mobile phone, includes one or more menus of options from which a user of the mobile phone can select to control what is being displayed on the display screen of the consumer electronic device. In certain embodiments, during the session, data indicative of which one or more options that are selected by the user of the mobile phone is provided from the mobile phone to a content presentation application installed on the consumer electronic device. Further, the GUI that is displayed on the mobile phone is provided to the mobile phone via one or more web page links that are provided to the mobile phone by the content presentation application, and content that is to be displayed on the consumer electronic device is provided based on image or video files that are stored in the memory of the consumer electronic device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTIONS OF THE DRAWINGS

FIGS. 3-10 illustrate examples of various menus and sub-menus that can be displayed on a user's mobile phone and used to control one or more TVs being displayed at a retail store and to observe and learn about the capabilities of the TV(s).

DETAILED DESCRIPTION

Figure 1:
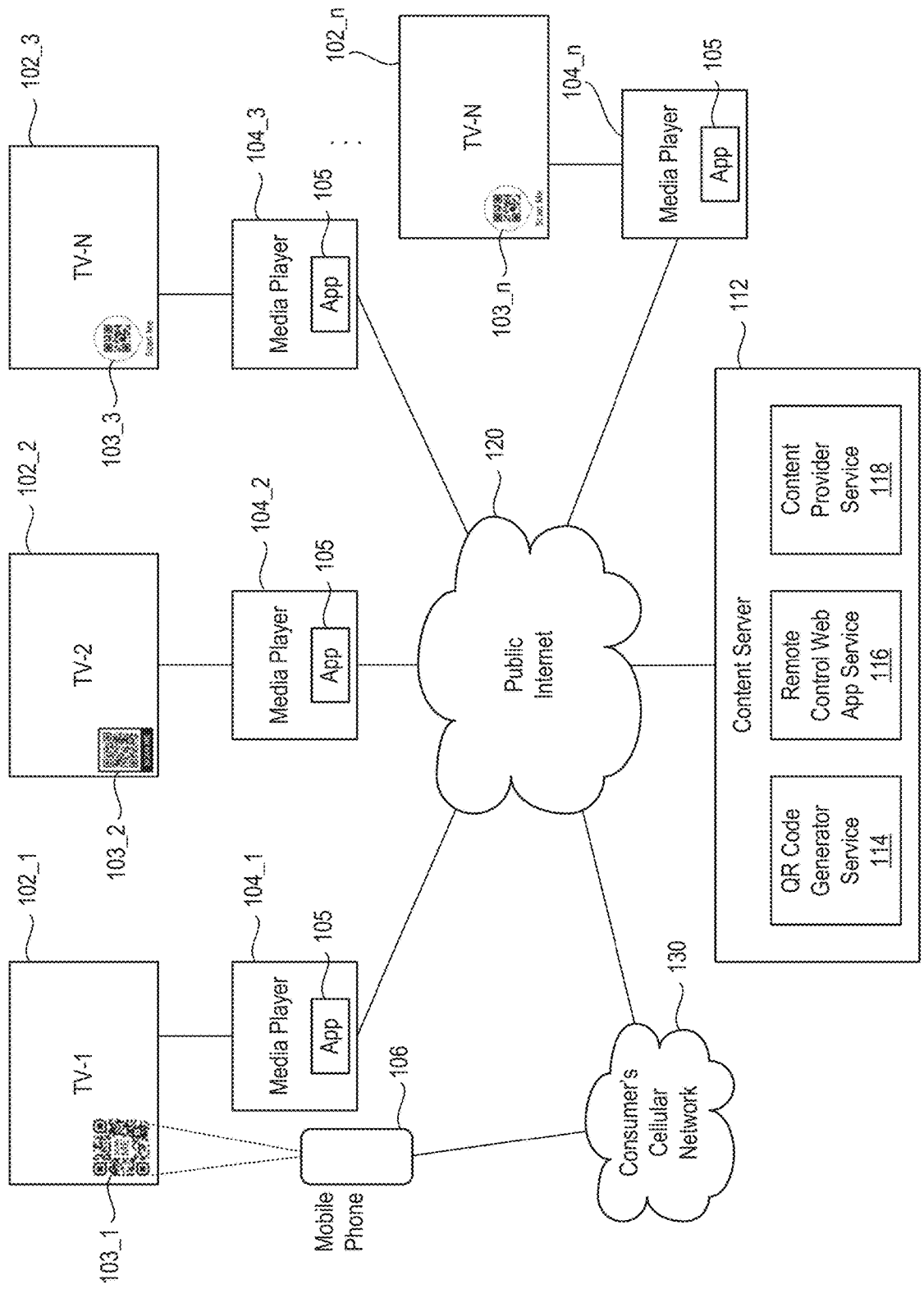
FIG. 1 is a high level block diagram that is used to describe certain embodiments of the present technology that enable a user (aka consumer) visiting a retail store to use their own mobile phone to control one or more televisions (TVs) being displayed at the store and to observe and learn about the capabilities of the TV(s).

FIG. 1 is a high level block diagram that is used to describe certain embodiments of the present technology. Referring to FIG. 1, shown therein is a plurality of televisions (TVs) 102_1, 102_2, 102_n, which can be referred to collectively as TVs 102, or individual as a TV 102. Such TVs 102 can, for example, be mounted to a wall within a retail store, and/or can be supported by one or more shelves within the retail store. Connected to each of the TVs 102 is a respective media player 104_1, 104_2, 104_n, which can be referred to collectively as the media players 104, or individually as a media player 104. Each of the media players 104 can be connected to a respective one of the TVs 102 via an HDMI (High-Definition Multimedia Interface) cable, or via some other wired and/or wireless connection, such as Bluetooth, or Wi-Fi, but not limited thereto. More generally, each of the media players 104 is communicatively coupled to a respective one of the TVs 102 via a wired and/or wireless connection.

The media players 104 are connected to the Internet 120 via one or more wired (e.g., Ethernet) and/or wireless connections, which may include a Wi-Fi network provided by the retail store, but is not limited thereto. Installed on each of the media players 104 is a host presentation application 105, which can also be referred to herein more succinctly as the presentation app 105, or even more succinctly as the app 105. Additional details of the host presentation app 105 are described below. Alternatively, the host presentation application 105 can be referred to as a content presentation application 105, or more succinctly, as a content presentation app 105. As will be described in additional detail below, each of the media players 104 can be used to display a unique Quick Response (QR) code on a respective one of the TVs 102 while also displaying video or other content on the respective one of the TVs 102. Alternatively, a single media player 104 can be used to display content on more than one of the TVs, so long as the media player 104 is able to simultaneously provide and display different content, including different video and different QR codes, on different ones of the TVs to which the media player 104 is communicatively coupled, e.g., via multiple HDMI cables.

Also shown in FIG. 1 is a content server 112, which can be implemented using one or more servers (which may or may not be co-located with one another), and thus can also be referred to herein as a content server system 112. The content server 112 can host and support various different services, including a QR code generator service 114, a remote control web app service 116, and a content provider service 118, as well as additional services.

The QR code generator service 114 generates unique QR codes that are displayable on the TVs 102, so that a displayed QR code can be scanned by a user (aka consumer) via a user's mobile phone. Example QR codes 103_1, 103_2, and 103_n, generated by the QR code generator service 114, are shown as being displayed on the TVs 102_1, 102_2, and 102_n, respectively. The QR codes 103_1, 103_2, and 103_n can be referred to collectively as the QR codes 103, or individually as a QR code 103. In FIG. 1, a consumer's mobile phone 106 is shown as being used to scan the QR code 103_1 that is displayed on the TV 102_1. In accordance with certain embodiments, a QR code (or more specifically, data for the QR code) that is generated by the QR code generator service 114 can be provided to a media player 104 via the Internet, as well as via a Wi-Fi network of a retail store. A host presentation app 105, which is installed on the media player 104, can cause the media player to display a QR code 103 on the TV 102 to which the media player 104 is connected (via a wired and/or wireless connection), in response to the media player 104 (or the app 105 installed thereon) receiving respective QR code data from the QR code generator service 114.

The QR code 103 that is displayed on a specific TV 102 can be continually displayed in a same location on the TV 102 (e.g., in the lower left corner), or can blink and/or float around to get a user's attention. Instructional text can optionally be included within the QR code 103 or adjacent to the QR code 103, which text can read "Scan Me," "Scan to Learn More about TV," "Scan to take control of TV," or the like. While the QR code is being displayed on the TV, other content (e.g., video or images) can also be stored on the TV. Such other content can, e.g., be stored in the memory (e.g., a storage card) of the media player 104 connected to the TV 102. For example, a sporting event, nature documentary, music concert, or the like, can be displayed on the TV 102 so that people can view the content and the picture quality provided by the TV 102.

Embodiments of the present technology enable a user (aka consumer) to use their mobile phone 106 to scan the QR code that is displayed on the TV 102 of interest to the user.

This establishes a session between the user's mobile phone 106 and the content server 112, wherein the session is associated with the specific TV, e.g., 102_1 that displayed the QR code, e.g., 103_1, that was scanned using the mobile phone 106. More specifically, scanning of the QR code can direct a web browser on the user's mobile phone 106 to a unique uniform resource locator (URL) for a webpage that is hosted by the content server 112. In accordance with certain embodiments, the webpage is served to the user's mobile phone 106 via a cellular network 130 to which the user subscribes (e.g., Verizon, AT&T, or T-Mobile), without requiring that the user join a dedicated Wi-Fi network of the store in which the TV and user are located. This provides for certain advantages, which are discussed below. The phrases a user's mobile phone, and the mobile phone of a user, are used interchangeably herein, and refer to a mobile phone that is owned, leased, or loaned to a user (aka consumer) and includes a web browser installed thereon.

As can be appreciated from the following description, embodiments of the present technology described herein enable a consumer (aka user) to user their mobile phone to quickly and easily take at least partial control of a selected TV that is on display in a retail store. Such embodiments of the present technology can alternatively be used to enable a consumer (aka user) to quickly and easily take at least partial control of other types of consumer electronic devices that include a display screen (besides TVs), so long as such other type of consumer electronic device can be communicatively coupled to a media player 104 (e.g., via an HDMI cable) such that the media player can provide the other type of consumer electronic device with video, images, and QR codes for display on the display screen of the consumer electronic device, or such that the other type of consumer electronic device can provide the capabilities of the media player. Examples of such other types of consumer electronic devices include, e.g., tablet computers, computer monitors, video projectors, etc. Where the consumer electronic device is a tablet computer, the tablet computer can provide the capabilities of the media player, thereby eliminating the need for a separate media player, although a separate media player can be used with a tablet computer if so desired. Similarly, where the consumer electronic device is a smart TV that allows apps to be downloaded to the TV, the smart TV can provide the capabilities of the media player, although a separate media player can be used with a smart TV if so desired. More generally, where the consumer electronic device is cable of downloading apps, rather than running the host presentation app 105 on the media player 104, the host presentation app 105 can alternatively run on the consumer electronic device (e.g., TV or tablet computer) itself. The host presentation app 105 can be downloaded from an app store, or the like, or can be preinstalled on the consumer electronic device. To simplify the description below, for most of the following discussion it is assumed that embodiments of the present technology are being used to enable a user to use their mobile phone to quickly and easily take control of a TV. Further, for most of the following discussion it is assumed that a TV 102 is connected to a media player 104 on which the host presentation app 105 is installed. However, it should be understood that in alternative embodiments the host presentation app 105 can instead be directly installed on the consumer electronic device itself, which should reduce overall costs by reducing the need for a separate media player 104. Further, is should be understood that the consumer electronic device that is being controlled using a mobile phone can be a device other than a TV, as just explained above.

In accordance with certain embodiments, the location of a user's mobile phone 106 (and thus, the user) can be determined using various different types of known, or future developed, geolocation technologies, which are also known as localization technologies. Determining the location of the mobile phone 106 may be achieved, e.g., using multilateration of radio signals between multiple cell towers of the network and the phone, or using a satellite-based radionavigation system, such as the Global Positioning System (GPS). To locate a mobile phone using multilateration of radio signals, the mobile phone should emit at least an idle signal to contact the next nearby antenna tower, but the process does not require an active call. Global System for Mobile Communications (GSM) technology, for example, can be used to determine the location of a mobile phone based on the phone's signal strength to a nearby cellular antenna. By knowing the location of a user's mobile phone 106, the system can determine when a user leaves a store, and can automatically terminate a session between the user's mobile phone 106 and the content server 112 once the user has left the store. A session can alternatively, or additionally, be terminated by timing out after a specified amount of time (e.g., 2 minutes, 3 minutes, or 5 minutes) since it started, and/or after a specified amount of time since the user last selected an option on one of the menus presented on the user's mobile phone 106. Additionally, or alternatively, a question can also be presented to the user, via their mobile phone, asking the user if they still want to maintain control over the selected TV, and a session can either be maintained or terminated based on the user's response to the question, or lack of response.

A new unique QR code (and more specifically, respective data therefor) is generated by the content server 112, and more specifically the QR code generator service 114 thereof, for each session so that multiple users do not interfere with one another when trying to control different TVs. During an active session, the TV associated with the session does not display a QR code so as to prevent another user from attempting to take over control of the TV or otherwise interrupt the session. Once a session expires or is otherwise terminated, the user's control of a TV 102 using their mobile phone 106 is disabled, and a new QR code 103 is generated by the QR code generator service 114 of the content server 112 and is provided to the media player 104 so that the new QR code 103 can be displayed on the TV. Thereafter, the new QR code can be scanned by another user. In alternative embodiments, rather than having QR codes be generated by the QR code generator service 114 of the content server 112, QR codes can alternatively be generated by the host presentation app 105 that is installed on the medial player 104, or that is alternatively installed on the TV 102, if the TV is a smart TV. In other words, the QR code generator service 114 can be provided by the host presentation app 105 in certain embodiments, wherein the host presentation app 105 can be installed on a consumer electronic device (e.g., a TV or tablet computer), or on a media player 104 that is communicatively coupled to the consumer electronic device.

In accordance with certain embodiments, after a session between a user's mobile phone 106 and the content server 112 is terminated, the content server 112 can push a URL to the user's mobile phone 106 that provides product information about the TV and the ability for the user to purchase the TV via the retail store's ecommerce website. Alternatively, this feature (of pushing a URL to the user's mobile phone, which URL provides product information about the TV or other consumer electronic device) can instead be performed by the "host presentation app 105" without any assistance from the content server 112.

In order to establish the aforementioned session between a user's mobile phone 106 and the content server 112, the remote control web app service 116 (which is hosted by the content server 112) serves a remote control web app to a user's mobile phone (e.g., 106) in response to a QR code (e.g., 103_1) being scanned by the mobile phone 106. More specifically, in response to the QR code 103 being scanned by the user's mobile phone 106, the remote control web app service 116 provides a URL or other link that, via a browser on the user's mobile phone, provides a graphical user interface (GUI) on the user's mobile phone 106. As will be described in additional detail below, this GUI can present various different selectable options to the user, which enables the user to select what content is displayed on a selected TV, e.g., 102_1. The selectable options may also enable a user to select from and thereby control certain audio features of the selected TV.

The content provider service 118 serves content to the specific TV, e.g., 102_1, in response to the user's selection of specific content via the GUI provided by the remote control web app service 116. The content provider service 118 knows which content is appropriate for the specific TV based on the QR code, so that the content (or at least some of the content) offered is specific to the TV on which the content is to be displayed. Example content that is specific to a TV make and model can be, e.g., TV specifications, such as the screen size, pixel resolution, number of HDMI ports, audio capabilities, built in smart TV apps, refresh rate, warranty information, and/or the like. Additional example content that is specific to a TV make and model can be, e.g., consumer reviews, expert reviews provided by various websites or other publications, and/or the like.

The content server 112, based on the QR code, can know or have access to a significant amount of information about the specific TV that the user is observing during the session, such as, the make and model of the TV, and the store within which the TV is located. Additionally, if the content server 112 is provided in advance with additional information about the TV, the content server 112 can also know additional information about the specific TV based on the QR code, such as the specific location (within the store) where the TV is located, the serial number (or other unique identifier) of the TV, and/or the like. In certain embodiments, where the content server 112 can determine the specific location of a TV within a retail store based on a QR code, the content server 112 can also determine which other TVs are located close to the selected TV that had displayed the QR code scanned by the user, so that the content server 112 can access and display to the user on the selected TV (having the QR code that was scanned) information about other TVs being offered by the retail store. For example, if a user uses their mobile phone 106 to scan the QR code 103_1 on the TV 102_1, the content server can cause information about the TV 102_1 to be displayed on the TV 102_1, and can also inform the user on the TV 102_1 that the TV 102_2 that is to the right of the TV 102_1 is a newer (or older) model of the TV 102_1 that provides certain features not available on the TV 102_1. This is just one example, which is not intended to be all encompassing.

During the session between the mobile phone 106 and the content server 112, the content server 112 provides (i.e., serves) the remote control web app service 116 to the user's mobile phone 106, and the remote control web app service 116 provides (via a browser on the mobile phone) the GUI on the user's mobile phone 106 that enables the user to select the specific content the user wants displayed on the specific TV. More specifically, scanning of the QR code can direct the user's mobile phone 106 to a unique URL for a webpage that is hosted by the content server 112 for the specific TV 102. The specific TV 102 that had displayed the QR code that was scanned by the user's mobile phone 106 can also be referred to herein as the selected TV, or more generally, the selected consumer electronic device.

In certain embodiments, in response to a user selecting specific content via the GUI displayed on their mobile phone 106, a request for content message is transmitted from the user's mobile phone 106 to the content server 112 via the cellular network 130 to which the user subscribes (e.g., Verizon, AT&T, or T-Mobile), without requiring that the user join a dedicated Wi-Fi network of the store in which the TV and user are located. This provides for certain advantages, which are discussed below. In addition to being transmitted via the cellular network 130 to which the user subscribes, the request for content message may also be transmitted via the Internet 120 to which the content server 112 is coupled. Alternatively, if a user has already joined a dedicated Wi-Fi network of the store in which the TV and user are located, then the request for content message can be transmitted from the user's mobile phone 106 to the content server 112 at least partially view the Wi-Fi network of the store. In response to the content server 112 receiving the request for content message from the user's mobile phone 106, the content server 112 causes the selected content to be displayed on the selected TV. In certain embodiments, media files (e.g., video files) for the various different content options, which can be chosen by a user (using a mobile phone 106) for display on the selected TV 102, are locally stored in memory of the media player 104. In alternative embodiments, media files (e.g., video files) for the various different content options, which can be chosen by a user (using a mobile phone 106) for display on the selected TV 102, are locally stored in memory of the TV 102. In such an embodiment, in response to the content server 112 receiving the request for the content message from the user's mobile phone 106, the content server 112 sends an instruction (aka command) to the app 105 installed on the media player 104 (or on the TV 102) to play the specific content selected by the user. Alternatively, the content server provides a URL to the app 105 on the media player 104 that is connected to the selected TV (that had displayed the QR code that was scanned by the user's mobile phone 106), which URL is a link to a webpage that provides the requested content. In such an embodiment, the host presentation app 105 that is installed on the media player 104 that is connected to the selected TV 102 can provide or function as a web browser for the selected TV 102. Alternatively, where the TV 102 is a smart TV on which the host presentation app 105 is installed, the smart TV itself can provide or function as a web browser. Instruction(s) that is/are sent from the content server 112 to the app 105 (installed on either the media player 104, the TV 102, or on some other consumer electronic device on which app 105 is installed) can be sent via the Internet and/or the consumer's cellular network, but is not limited thereto.

Figure 2:
FIG. 2 illustrates an example of an initial remote control landing page that can be displayed on a user's mobile phone in response to the user scanning a QR code that is being displayed on one of the TVs on display in a retail store.

FIG. 2 illustrates an example of an initial remote control landing page 202 including a "Take Control" button 204 that can be displayed on a user's mobile phone 106 in response to the user scanning a QR code 103 on one of the TVs 102. In response to the user selecting the "Take Control" button 204, the user is provided with the capability of taking control of what is displayed on the one of the TVs 102 that included the QR code 103 that was scanned by the user using their mobile phone 106. More specifically, in response to the user selecting the "Take Control" button 204 (or some other activation button), a menu 302 of different options is displayed to the user on the display screen of their mobile phone 106. The menu 302 shown in FIG. 3 is an example of what may be displayed to the user in response to them pressing the "Take Control" button 204 shown in FIG. 2.

Figure 3:
Figure 3:
Figure 3:
Figure 3:
Figure 3:
Figure 3:
Figure 3:
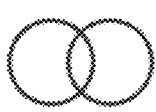
Figure 3:
Figure 4:
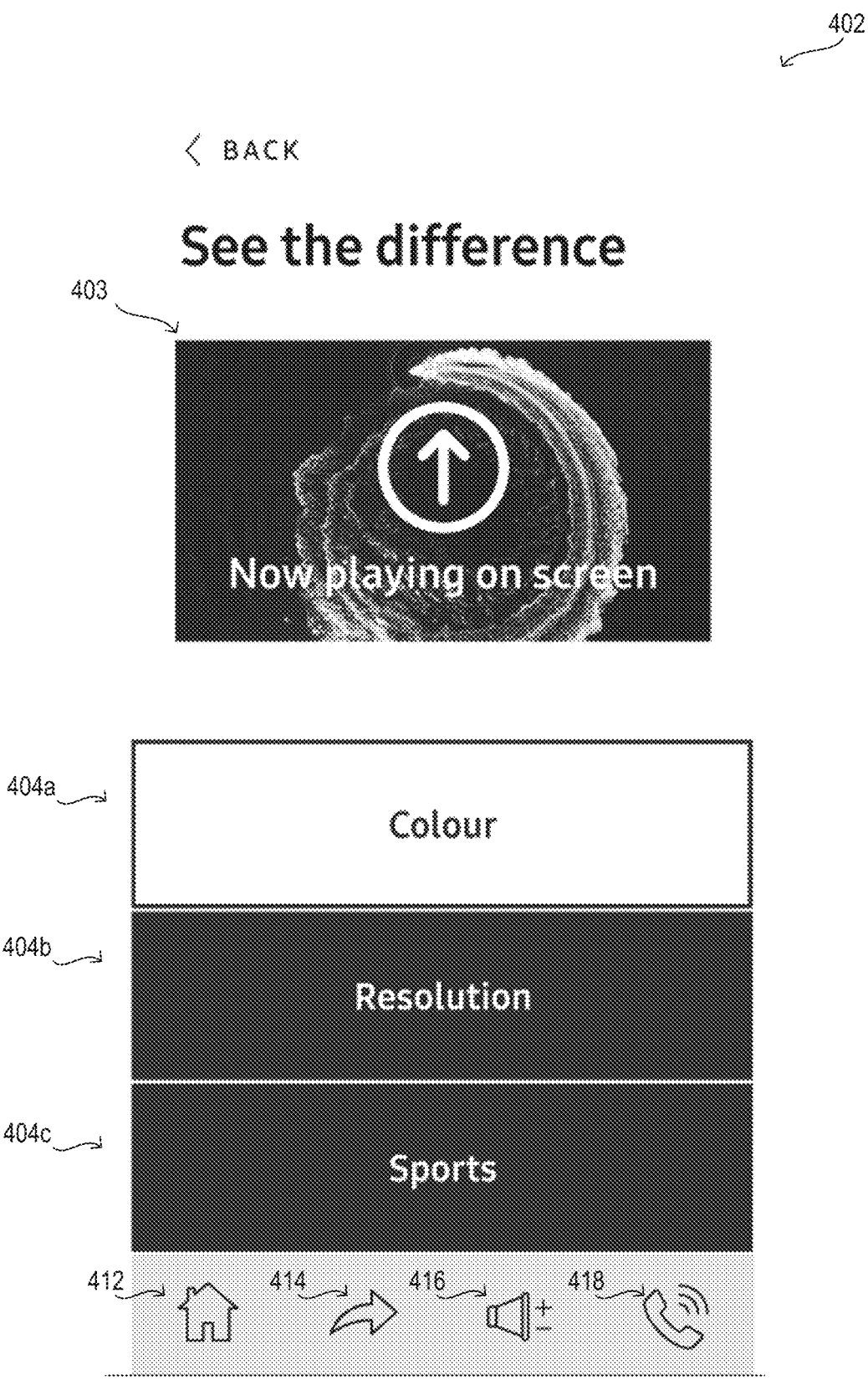

Referring to FIG. 3, the example home menu 302 shown therein, which can be displayed on the user's mobile phone 106, include a "See the difference" option 304a, an "Explore the features" option 304b, a "Hear and experience" option 304c, and a "Compare size & space" option 304d. In this example, in response to the user selecting the "See the difference" option 304a, the sub-menu 402 shown in FIG. 4 can be presented to the user on the user's mobile phone 106. As shown in FIG. 4, the "See the difference" sub-menu 402 includes a "Colour" option 404a, a "Resolution" option 404b, and a "Sports" option 404c. In this example, the "Colour" option 404a has been selected by the user, or is initially selected by default, and a video shown in a thumbnail 403 on the display screen of the mobile phone 106 is what is being displayed on the TV 102 that had displayed the QR code that was scanned by the user's mobile phone 106. As noted above, the specific TV 102 that had displayed the QR code that was scanned by the user's mobile phone 106 can also be referred to herein as the selected TV. For a specific example, referring briefly back to FIG. 1, if the user had scanned the QR code 103_1 displayed on the TV 102_1, then the video shown in the thumbnail 303 would be displayed on the TV 102_1 in response to the user selecting the "See the differences" option 204a and the "Colour" option 304a. In this example, the TV 102_1 is the selected TV.

Referring again to FIG. 4, in this example, what is shown in the thumbnail video image 303 and on the TV is associated with the "Colour" option 404a. Other options that can be selected on the "See the difference" menu 402 include a "Resolution" option 404b, and a "Sports" option 404c. The specific video that is shown on the selected TV 102 in response to the user selecting the "Colour" option 404a preferably enables the user to appreciate the color (aka colour) capabilities of the selected TV. A different video can be displayed on the selected TV 102 (and in the thumbnail 403) in response to the user selecting the "Resolution" option 404b, which video preferably enables the user to appreciate the resolution capabilities of the selected TV. Still another video can be displayed on the selected TV 102 (and in the thumbnail 403) in response to the user selecting the "Sports" option 404c, which video preferably enables the user to appreciate how well the selected TV 102 performs when a fast paced sporting event is being displayed on the selected TV 102. In the above described embodiment, a thumbnail version of the video being displayed on the selected TV 102 is also shown on the display screen of the user's mobile phone 106, however that need not be the case (i.e., the thumbnail 403 can be eliminated).

Figure 5:
Figure 6:
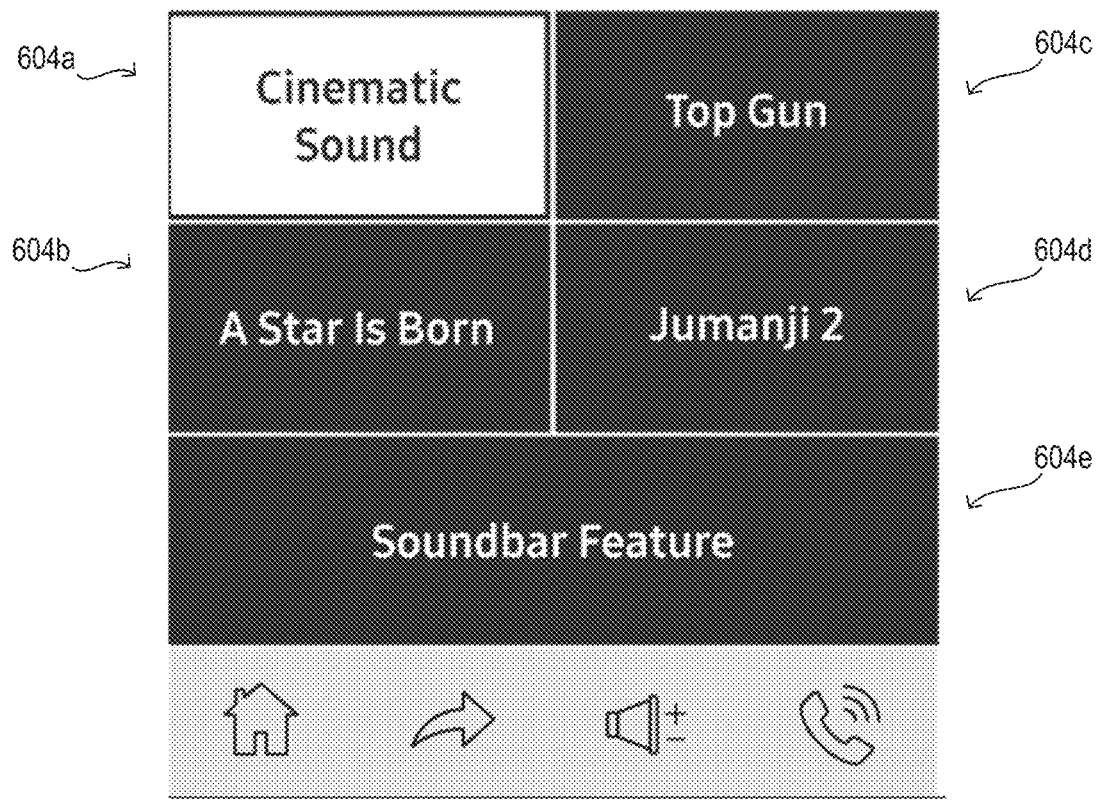
Figure 7:
Figure 7:
Figure 7:
Figure 7:
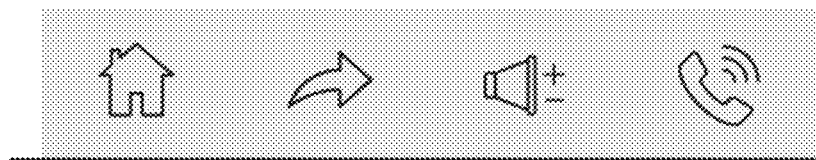

At the bottom of the menu 402 shown in FIG. 4, as well as the bottom of other menus described herein with reference to FIGS. 5-7, there is a home button 412, a forward button 414, a volume button 416, and a chat button 418. In response to the user selecting the home button 412, there is a return to the home menu 302 shown in FIG. 3 (or some other home menu). In response to the user selecting the forward button 414 a screen is displayed that provides the user with an option to enter their mobile phone number, or an email address, to which the user wants more information on the selected TV sent. In response to the user selecting the volume button 416 the user is provided with a GUI that enables the user to control the volume of the selected TV, e.g., using a "+" button and a "−" button, or the like, that is displayed on the user's mobile phone 106. In response to the user selecting the chat button 418 the user is provided with the option of calling, texting or messaging with a representative of the manufacturer of the TV and/or calling, texting or messaging or a sales representative of the retail store in which the user is located.

Returning briefly to the home menu 302 shown in FIG. 3, in response to a user selecting the "Explore the features" option 306b, the "Explore the features" sub-menu 502 shown in FIG. 5 can be displayed on the display screen of the user's mobile phone 106. As shown in FIG. 5, the "Explore the features" sub-menu 502 includes a "QLED 8K features" option 504a and a "8K AI upscaling" option 504b. In this example, the "QLED 8K features" option 504a has been selected by the user, or is initially selected by default, and a video shown in a thumbnail 503 on the display screen of the mobile phone 106 is what is being displayed on the selected TV 102 (that had displayed the QR code that was scanned by the user's mobile phone 106). The specific video that is shown on the selected TV 102 in response to the user selecting the "QLED 8K features" option 504a preferably enables the user to appreciate the QLED 8K capabilities of the selected TV. A different video can be displayed on the selected TV 102 (and in the thumbnail 503) in response to the user selecting the "8K AI upscaling" option 504b, which video preferably enables the user to appreciate the 8K AI capabilities of the selected TV. In the above described embodiment, a thumbnail version of the video being displayed on the selected TV 102 is also shown on the display screen of the user's mobile phone 106, however that need not be the case (i.e., the thumbnail 503 can be eliminated).

Returning briefly to the home menu 302 shown in FIG. 3, in response to a user selecting the "Hear the experience" option 306c, the "Hear the experience" sub-menu 602 shown in FIG. 6 can be displayed on the display screen of the user's mobile phone 106. As shown in FIG. 6, the "Hear the experience" sub-menu 602 includes five different options 604a, 604b, 604c, 604d, and 604e. In this example, the "Cinematic Sound" option 604a has been selected by the user, or is initially selected by default, and a video shown in a thumbnail 603 on the display screen of the mobile phone 106 is what is being displayed on the selected TV 102. The specific video that is shown on the selected TV 102 in response to the user selecting the "Cinematic Sound" option 604a preferably enables the user to appreciate the cinematic sound capabilities of the selected TV, and if cinematic sound is an audio setting of the selected TV, that audio setting is turned on. The options 604b, 604c, and 604d allow a user to select various different movies to view and listen to via the selected TV. The specific video that is shown on the selected TV 102 in response to the user selecting the "Soundbar feature" option 604e preferably enables the user to appreciate the soundbar capabilities of the selected TV, and if soundbar is an audio setting of the selected TV, that audio setting is turned on.

Returning briefly to the home menu 302 shown in FIG. 3, in response to a user selecting the "Compare size & space" option 306d, the "Compare size & space" sub-menu 702 shown in FIG. 7 can be displayed on the display screen of the user's mobile phone 106. As shown in FIG. 7, the "Compare size & space" sub-menu 702 includes a "Sizes" option 704a, a "Resolution" option 704b, and a "Models" option 704c.

Figure 8:
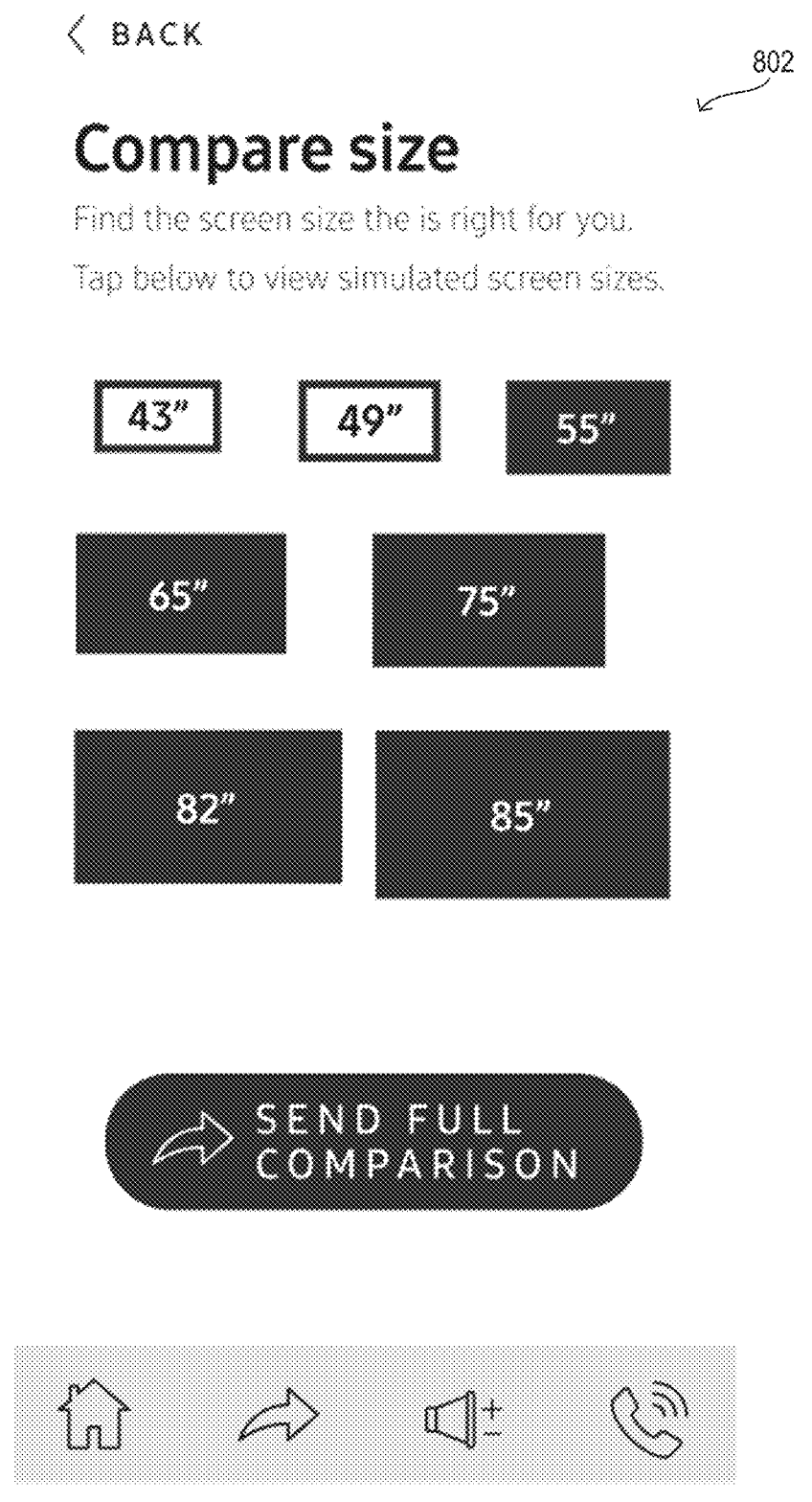

In response to the user selecting the "Sizes" option 704a on the sub-menu 702, a further sub-menu 802 shown in FIG. 8 is displayed on the user's mobile phone 106, which enables the user to view various different simulated screen sizes on the selected TV, as can be appreciated from FIG. 8. There is also a "Send Full Comparison" button. In response to the user selecting the "Send Full Comparison" button a screen is displayed that provides the user with an option to enter their mobile number, or an email address, to which the user wants more detailed size comparison information sent.

Figure 9:
Figure 9:
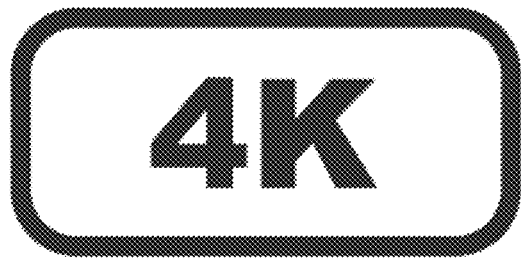
Figure 9:
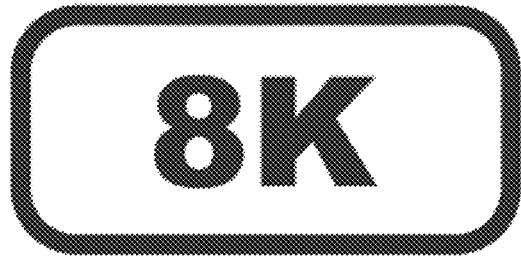
Figure 9:
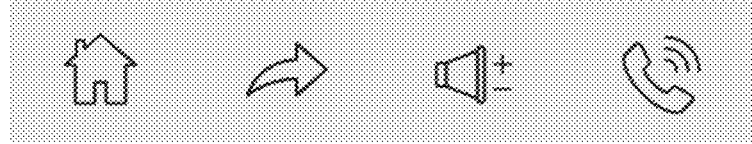

Returning briefly to FIG. 7, in response to the user selecting the "Resolution" option 704b on the sub-menu 702, a further sub-menu 902 shown in FIG. 9 is displayed on the user's mobile phone 106, which enables the user to view various different simulated pixel resolutions on the selected TV 102, as can be appreciated from FIG. 9.

Figure 10:
Figure 10:
Figure 10:
Figure 10:
Figure 10:
Figure 10:
Figure 10:
Figure 10:
Figure 10:
Figure 10:
Figure 10:
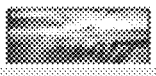
Figure 10:
Figure 10:
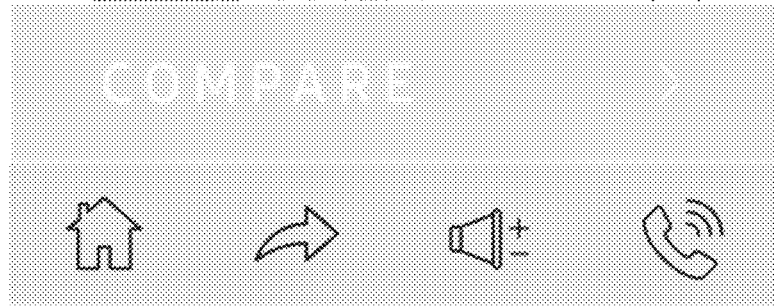

Returning briefly to FIG. 7, in response to the user selecting the "Models" option 704c on the sub-menu 702, a further sub-menu 1002 shown in FIG. 10 is displayed on the user's mobile phone 106, which enables the user to compare up to three different models of TVs to one another, as can be appreciated from FIG. 10. In a specific implementation, where two or the three models selected are located within the same retail store, a common image can be shown on all the selected TVs so that the user can compare the video and audio of the various TVs to one another, so long as one or more other user(s) is/are not controlling the other TV(s).

Embodiments of the present technology are not limited to providing the specific menus and sub-menus shown in and described above with reference to FIGS. 2-10. Rather, such menus and sub-menus have been provided to show and explain a specific example of an embodiment of the present technology.

Embodiments of the present technology described herein enable a consumer to approach a TV, e.g., 102_1, that is displaying a video (e.g., in a loop, but not limited thereto) as well as displaying a QR code, e.g., 103_1. In response to the user scanning the QR code using their personal mobile phone 106, the QR code 103_1 directs the consumer's mobile phone 106 to a unique URL hosted by the content server 112, and presents a remote control GUI (e.g., 202 or 302) to the consumer, examples of which were described above with reference to FIGS. 2-10. Using the remote control GUI, which can include various menus and sub-menus (e.g., 202, 302, 402, 502, 602, 702, 802, 902, and 1002), and/or the like, the consumer can select from a range of options presented via the remote control GUI, such as playing a video, learning about and/or selecting various features available on the TV, comparing various features and/or TVs, and/or the like. In accordance with certain embodiments, selecting an option (e.g., by pressing a certain button on the remote control GUI) causes a content request message to be sent from the user's mobile phone 106 to the content server 112, in response to which the content server 112 provides a content response message (which can include, e.g., a URL) to the host presentation application 105 installed on the media player 104 that is connected to the selected TV 102.

As explained above, embodiments of the present technology described herein enable a consumer (aka user) to quickly and easily take at least partial control of a TV on display in a retail environment to thereby cause the TV to display various videos, images, and specifications relevant to that particular TV (or a group of TVs). Such embodiments can alternatively be used to enable a consumer (aka user) to quickly and easily take at least partial control of other types of consumer electronic devices that include a display screen (besides TVs), so long as such other types of consumer electronic devices can be communicatively coupled (e.g., via an HDMI cable) to a media player 104 such that the media player 104 can provide the other type of consumer electronic device with video content, images, and QR codes for display, or so long as such other types of consumer electronic device can provide the capabilities of the media player. Examples of such other types of consumer electronic devices include, e.g., tablet computers, computer monitors, and video projectors, but are not limited thereto.

In accordance with certain embodiments, each of the aforementioned apps can be programmed using Hypertext Markup Language (HTML), which is the standard markup language for documents designed to be displayed in a web browser. It is also within the scope of the embodiments described herein for alternative programming languages to be used to program such apps.

In the above described embodiments, different QR codes were described as being displayed on the different TVs, which enable a user to select a specific TV to take control of and learn about, by scanning the QR code shown on the TV. Other types of unique scannable codes (aka bar codes) can alternative be used, besides QR codes, such as, but not limited to, AR codes, Aztec codes, bCodes, Data Matrix codes, DotCode, JAB-Code, MaxiCode, Qode, SPAR-QCode, etc.

As noted above, in accordance with certain embodiments, webpages are served to the user's mobile phone 106 via the cellular network 130 to which the user subscribes (e.g., Verizon, AT&T, or T-Mobile), without requiring that the user join the dedicated Wi-Fi network of the store in which the TV and user are located. This is advantageous, because when a user's phone joins a store's Wi-Fi network, it is often the case that the user cannot use their mobile phone 106 to make phone calls, send emails, and user their web browser. In other words, many of the features of a user's mobile phone 106 typically do not work while the mobile phone 106 is connected to the store's Wi-Fi network. These disadvantages are avoided where the user's mobile phone 106 remains connected to the cellular network 130 to which the user subscribes, rather than being connected to the store's Wi-Fi network. Nevertheless, unless stated otherwise, the various embodiments of the present technology described herein may still be used where the user's mobile phone is connected to the store's Wi-Fi network.

Figure 11:
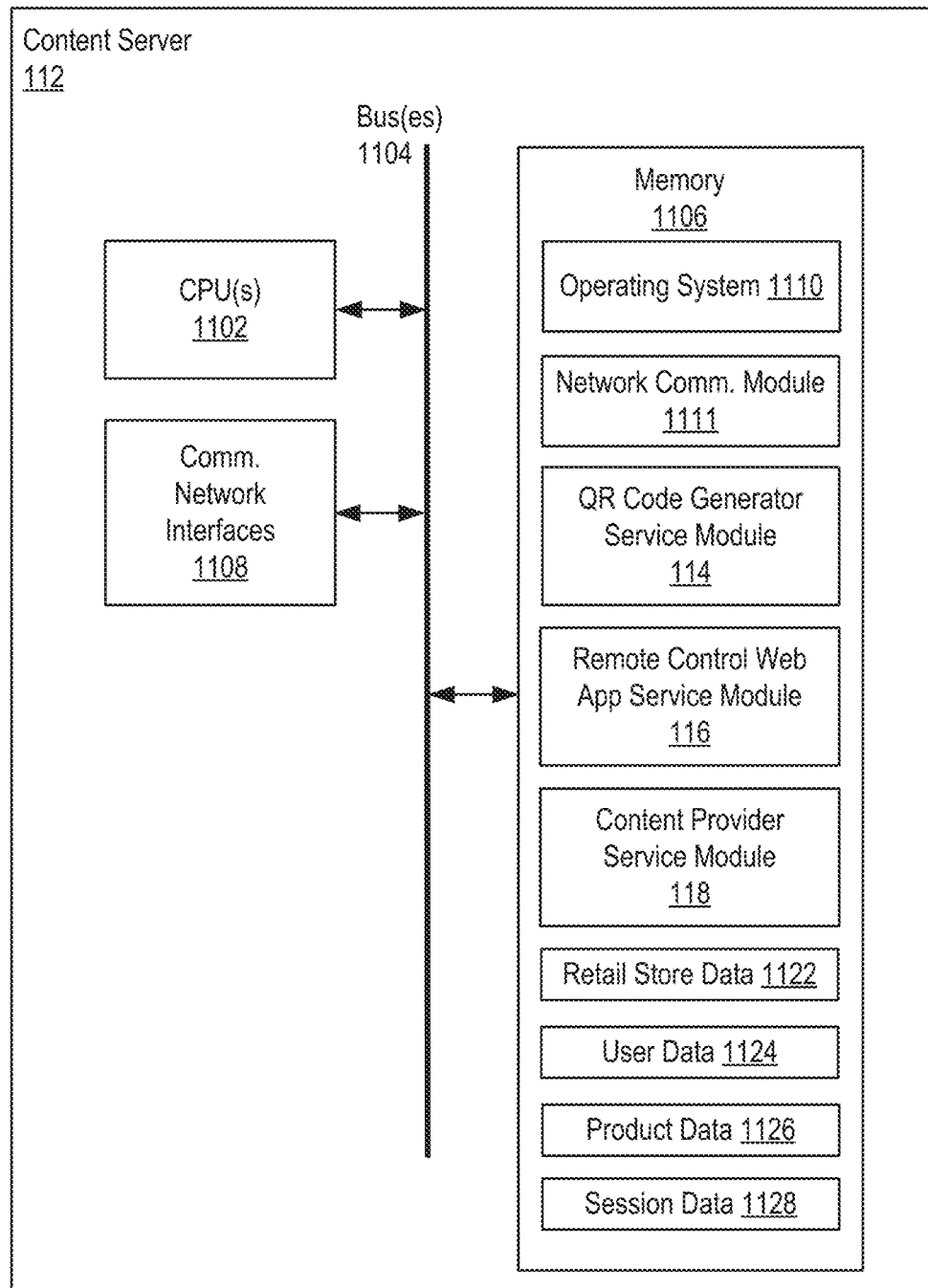
FIG. 11 is a high level block diagram illustrating an example implementation of the content server shown in FIG. 1.

FIG. 11 is a high level block diagram illustrating an example implementation of the content server 112. The content server 112 typically includes one or more processors (e.g., CPU's) 1102, one or more network or other communications interfaces 1108, memory 1106, and one or more communication buses 1104 for interconnecting these components. The communication buses 1104 optionally include circuitry (sometimes called a chipset) that interconnects and controls communications between system components. The memory 1106 can include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 1106 includes one or more storage devices remotely located from the CPU(s) 1102. The memory 1106, including the non-volatile and volatile memory device(s) within the memory 1106, comprises a non-transitory computer readable storage medium. In some implementations, the memory 1106 or the non-transitory computer readable storage medium of memory 1106 stores the following programs, modules and data structures, or a subset thereof, including an operating system 1110, a network communication module 1111, as wells as modules for each of the services discussed above with reference to FIG. 1, including a QR code generator service module 114, a remote control web app service module 116, and a content provider service module 118. The memory 1106 can also be used to store and otherwise support one or more databases that are used to store retail store data 1122, consumer (aka) user data 1124, product data 1126 (e.g., about TVs 102 or other devices including display screens located in retail stores), session data 1128, etc. The memory 1106, and/or other types of storage media of the content server 112 can be referred more generally herein as a data store.

The operating system 1110 includes procedures for handling various basic system services and for performing hardware dependent tasks. The network communication module 1111 facilitates communication with other devices and computers (e.g., the media players 104 and mobile phones 106) via the one or more communication network interfaces 1108 (wired or wireless) and one or more communication networks, such as the Internet, other wide area networks, local area networks, metropolitan area networks, and so on.

Although FIG. 11 shows an example implementation of the content server 112, FIG. 11 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 1110 and network communication module 1111) shown separately in FIG. 11 could be implemented on a single server and single items could be implemented by one or more servers. The actual number of servers used to implement the content server 112 and how features are allocated among them will vary from one implementation to another, and, in some instances, depends in part on the amount of data traffic that the system must handle during peak usage periods as well as during average usage periods.

Figure 12:
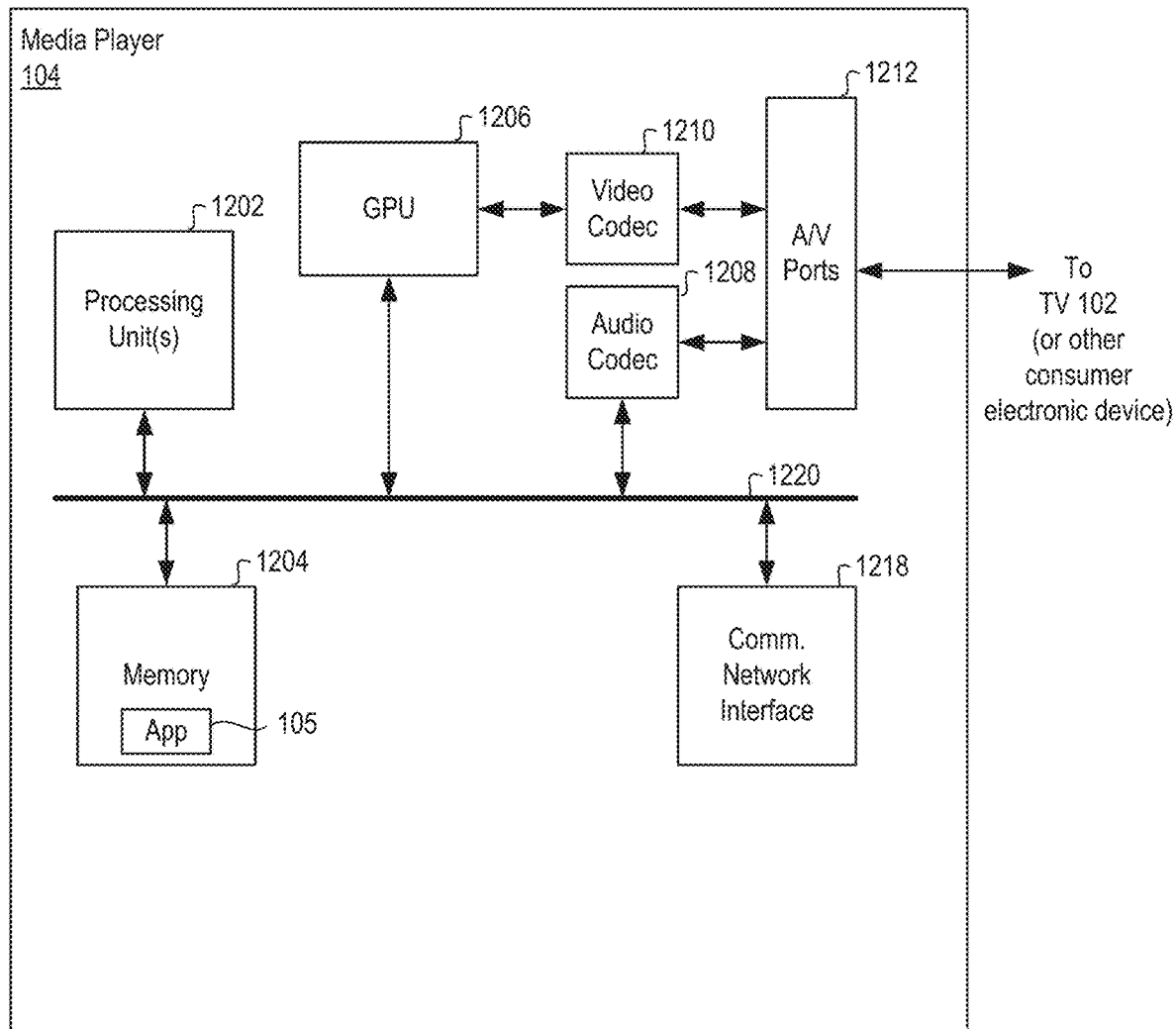
FIG. 12 is a high level block diagram illustrating an example implementation of a media player shown in FIG. 1.

FIG. 12 is a block diagram illustrating an example implementation of a media player 104 introduced in FIG. 1. Referring to FIG. 11, the media player 104 shown therein includes one or more processing units 1202 (which can also be referred to processors), memory 1204, a graphical processing unit (GPU) 1206, an audio codec 1208, a video codec 1210, audio-video (A/V) ports 1212, a communication network interface 1218 and a bus 1220. The media player 104 shown in FIG. 12 is only one example of a suitable computing device and is not intended to suggest any limitation as to the scope of use or functionality of the presently disclosed subject matter. Neither should the media player 104 be interpreted as having any dependency or requirement relating to any one or combination of components illustrated in the example media player 104. In some embodiments the various depicted computing elements may include circuitry configured to instantiate specific aspects of the present technology. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The media player 104 can includes a variety of computer readable media. Computer readable media can be any available media that can be accessed by the media player 104 and includes both volatile and nonvolatile media, removable and non-removable media. Such computer readable media is generally represented by the memory 1204, which can include volatile and/or nonvolatile memory such as read only memory (ROM) and random access memory (RAM). The memory 1204 can store, e.g., a basic input/output system (BIOS), data and/or program modules that are immediately accessible to the processing unit 1202. The memory 1204 can also store an operating system, application programs, other program modules, and program data. The memory 1204 can also store the host presentation application 105 (aka content presentation application 105), discussed above, as well as video data that is used to display videos in a loop on a TV 102 during those times that a user (aka) consumer has not taken control of the TV 102 (or other consumer electronic device including a display screen).

The media player 104 can also include other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like.

A TV 102 (in FIG. 1) or other consumer electronic device including a display screen can be connected to the video codec 1210 via audio-video (A/V) ports 1212 or some other video interface. Speakers or some other audio output device(s) can be connected to the audio codec 1208 via the A/V ports 1212 or some other audio interface. An A/V port 1212 can be, e.g., an HDMI port, or the like.

In certain embodiments, as explained above, rather than a TV 102 (or other consumer electronic device) being connected to a media player 104 on which the host presentation application 105 is installed, the host presentation application 105 can be directly installed on the TV 102 (e.g., a smart TV) or other type of consumer electronic device on which apps can be installed. In such embodiments, all or some of the elements of the media player 104 that were described above with reference to FIG. 12 can be included in the TV 102 or other type of consumer electronic device. For example, a smart TV or tablet computer can have processing unit(s) 1202, a GPU 1206, a video codec 1210, an audio codec 1208, a communication network interface 1218, etc.

In many of the embodiments described above, the content server 112 was described as providing the content to a TV or other type of consumer electronic device (or to a media player communicatively coupled to the TV or other type of consumer electronic device), in response to a user selecting specific content via the GUI displayed on their mobile phone 106, and a request for content message being transmitted from the user's mobile phone 106 to the content server 112 during a session established between the user's mobile phone 106 and the content server 112. In alternative embodiments, prior to a session being established between a user's mobile phone 106 and the content server 112, the content server 112 can provide various content to the consumer electronic device (or to a media player communicatively coupled to the consumer electronic device), so that such content is locally stored in the memory of the consumer electronic device (or in the memory of a media player communicatively coupled to the consumer electronic device). Then, when a user uses the GUI displayed on their mobile phone 106 to select specific content to be displayed on the consumer electronic device (e.g., a TV), the content can be retrieved from the memory of the consumer electronic device (or the memory of the media player communicatively coupled to the consumer electronic device), without the content server 112 needing to serve the content during the session. Rather, in certain embodiments the content server 112 will instruct a TV (or a media player communicatively coupled thereto), what content should be retrieved from memory of the TV (or from memory of the media player). From time to time (e.g., periodically, or aperiodically) the content server 112 can update the content that it provides to consumer electronic devices (and/or to media players communicatively coupled to consumer electronic devices) to provide for updated reviews, video content, and/or the like.

In certain embodiments, a user can user their mobile phone 106 to control the content that is displayed on multiple TVs (or other types of consumer electronic devices), to enable the user to compare the video quality, reviews, and/or specifications of the multiple TVs (or other types of consumer electronic devices). For example, the user can use the GUI displayed on their mobile phone 106 to request that specific video content (e.g., video of a sporting event, or video of a nature scene) be displayed on multiple TVs at the same time, so that the user can observe how the same video content looks to them on the multiple different TVs, which may be different TV models produced by the same manufacturer (e.g., Samsung) and/or by different manufacturers (e.g., Samsung, Sony, Panasonic, Vizio, etc.). For another example, the user can use the GUI displayed on their mobile phone 106 to request that each TV of a plurality of different TVs display respective information about the quantity and types of input ports that are provided by the TV. For still another example, the user can use the GUI displayed on their mobile phone 106 to request that each TV of a plurality of different TVs display respective consumer reviews of the TV. To provide for the aforementioned capabilities, one of the consumer electronic devices, e.g., TVs (or one of the media players communicatively coupled to the consumer electronic devices, e.g., TVs) can act as a master device, while one or more other consumer electronic devices can act as one or more slave device(s).

The master device can be the specific device (e.g., smart TV, or media player communicatively coupled to a TV) that was at least in part responsible for the displaying of the QR code (other scannable code) that was scanned by the mobile phone 106 of the user, and the slave devices can be other TVs (or other media players coupled to the other TVs) that are co-located with the master device. For example, referring briefly back to FIG. 1, if a user scans the QR code 103_1, then the media player 104_1 can act as the master device, and the media players 104_2 ... 104_*n* can act as slave devices. Where capabilities of the media players 104 are incorporated into one or more of the TVs 102 themselves, then the TV 102_1 can act as the master device, and one or more of the other TVs (e.g., 102_2 and/or 102_3) can act as slave devices. The app 105 that is installed on the consumer electronic devices, and/or media players 104, can provide for both master device capabilities and slave device capabilities, to thereby enable any device on which the app 105 is installed to be capable of acting as a master device or a slave device at any given time.

At some point in time after a user scans a QR code (or other scannable code) that is being displayed on a TV (or the display of some other type of consumer electronic device), the user can be given the option of using their mobile phone 106 to control the content of what is being displayed on just that one TV, e.g., 102_1 (that displayed the QR code that was scanned), or using their mobile phone 106 to control the content of what is being displayed on multiple TVs. If the user selects the option to control multiple TVs (or other types of consumer electronic devices), then it can be predetermined what other devices can also be controlled when a specific device is acting as the master device. For example, if a group of four TVs is being displayed on the same shelf in a retail store, then the apps 105 installed on the TVs (or on the media players coupled to the TVs) can be programmed or otherwise configured such that when any one of the four TVs (or media players coupled thereto) is selected to act as a master device, the remaining three TVs (or media players coupled thereto) will automatically be configured to acts as slave devices. Alternatively, a user may be given the option of selecting which of the remaining three TVs they also want to at least partially control. For example, after a user scans the QR code 103_1 displayed on the TV 102_1 in FIG. 1, and after the user indicates that they want to control what is displayed on multiple TVs 102, the GUI that is displayed on the user's mobile phone 106 may ask the user to select for which other TVs (e.g., of TVs 102_2, 102_3, and 102_4) the user also wants to control the content being displayed.

Referring to FIG. 1, assume for an example that a user uses their mobile phone 106 to scan the QR code 103_1 that is being displayed on the TV 102_1, and thereafter the user indicates via the GUI that is displayed on their mobile phone 106 that the user also wants to control what is being displayed on the TVs 102_2 and 102_3 that are located on the same wall or shelf in the retail store. Now assume that the user uses the sub-menu 602 (shown in FIG. 6) to select the option 604*c* to indicate that they want a video clip from the movie Top Gun to be displayed. This will cause the same video clip from the movie Top Gun to be displayed on all three TVs 102_1, 102_2, and 102_3 simultaneously. This capability can be achieved in a few different ways. In certain embodiments, the content server 112 can simultaneously stream the same video clip to all three TVs 102_1, 102_2, and 102_3 (or to the media players 104_1, 104_2, and 104_3 communicatively coupled respectively to the TVs 102_1, 102_2, and 102_3). Alternatively, if a video file containing the video clip is already stored in the memory of each of the TVs 102_1, 102_2, and 102_3 (or the memory of the each of the media players 104_1, 104_2, and 104_3), then the master device can communicate with the slave devices to cause that video file (that includes the video clip from the movie Top Gun) to be selected and displayed on the TV 102_1, as well as the TVs 102_2 and 102_3. Such communications between the master device and the slave devices can be performed via a wired and/or wireless local area network (LAN) to which all of the TVs (or media players) are coupled. Various different types of messaging protocols can be used to enable the master device and slave devices to communicate with one another, such as, but not limited to, the User Datagram Protocol (UDP), or the WebSocket communications protocol.

Continuing with the above example, assume that the user uses another sub-menu (not shown) to indicate that they want to learn about the quantity and types of input ports that are provided by the TVs 102_1, 102_2, and 102_3 shown in FIG. 1. In certain embodiments, the content server 112 can simultaneously cause a first input port image or video file specific to the TV 102_1 to be displayed on the TV 102_1, a second input port image or video file specific to the TV 102_2 to be displayed on the TV 102_2, and a third input port image or video file specific to the TV 102_3 to be displayed on the TV 102_3. Alternatively, a respective input port image or video file that corresponds each of the TVs 102_1, 102_2, and 102_3 can be stored in the respective memory of each of the TVs 102_1, 102_2, and 102_3 (or in the respective memory of each of the media player's 104_1, 104_2, and 104_3 communicatively coupled to the TVs 102_1, 102_2, and 102_3) and the master device can cause the TVs 102_1, 102_2, and 102_3 to simultaneously each display their respective input port image or video file.

In certain embodiments, the content server 112 or a master device can cause a group of TVs (or other consumer electronic devices) to display portions of a same image or video. For example, referring to FIG. 1, a panoramic image or video of a beach scene can be displayed on the TVs 102_1, 102_2 and 102_3 where a left portion of the beach scene is shown on the TV 102_1, a center portion of the beach scene is shown on the TV 102_2, and a right portion of the beach scene is shown on the TV 102_3. In such embodiments, as an object (e.g., a flying bird, or walking person) moves within the scene, that object may transition from being displayed on the TV 102_1, to being displayed on the TV 102_2, to being displayed on the TV 102_3, or vice versa.

In many of the embodiments described above, a session was described as being established between the content server 112 and a mobile phone 106, in response to a user of the mobile phone 106 using the mobile phone 106 to scan a QR code 103 (or other type of scannable code). In alternative embodiments, a session can instead be established between a media player 104 (on which the app 105 is installed) and a user's mobile phone 106, in response to a user of the mobile phone 106 using the mobile phone 106 to scan a QR code 103 (or other type of scannable code). In still other alternative embodiments, a session can instead be established between a TV 102 on which the app 105 is installed (or another type of consumer electronic device on which the app 105 is installed) and a user's mobile phone 106, in response to a user of the mobile phone 106 using the mobile phone 106 to scan a QR code 103 (or other type of scannable code).

Figure 13:
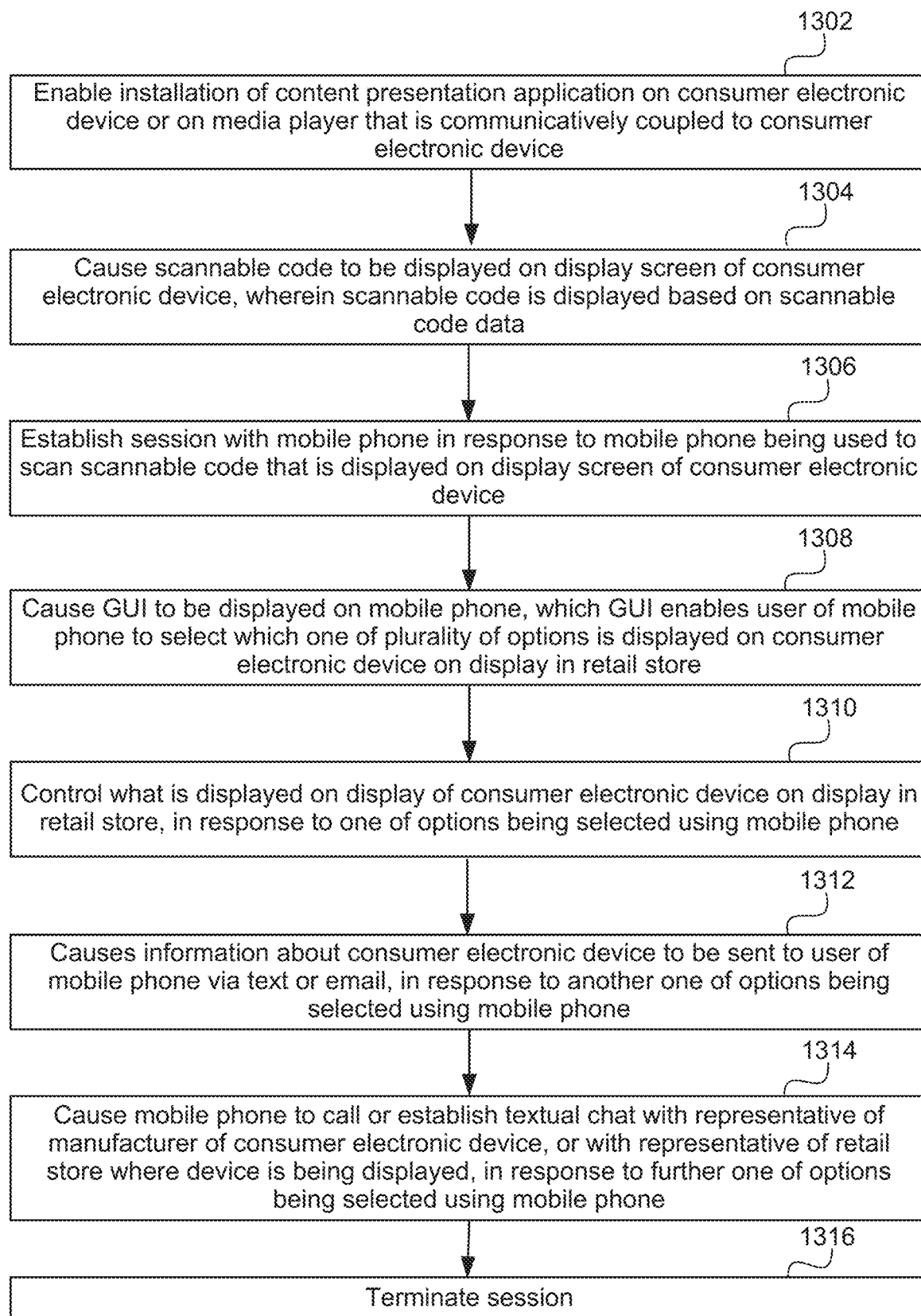
FIG. 13 is a high level flow diagram that is used to summarize methods according to various embodiments of the present technology.

The high level flow diagram of FIG. 13 will now be used to summarize methods according to various embodiments of the present technology. Such methods enable a user of a mobile phone (e.g., 106) to use the mobile phone to select what content is displayed on a display screen of a consumer electronic device (e.g., a TV 102) that is on display in a retail store. Referring to FIG. 13, step 1302 involves enabling installing of a content presentation application (e.g., 105) on the consumer electronic device (e.g., a TV 102) or on a media player (e.g., 104) that is communicatively coupled to the consumer electronic device. In certain embodiments, step 1302 can be achieved by making the content presentation application available for download (e.g., via a website or app store) to the consumer electronic device (e.g., a TV 102) or to a media player (e.g., 104) that is communicatively coupled to the consumer electronic device. Alternatively, or additionally, step 1302 can be achieved by making the content presentation application (e.g., 105) available to a vendor of the consumer electronic device (e.g., a TV 102) or of a media player (e.g., 104) that can be communicatively coupled to the consumer electronic device, so that the content presentation application can be preinstalled by the vendor on the consumer electronic device or on a media player that can be communicatively coupled to the consumer electronic device.

Still referring to FIG. 13, step 1304 involves causing a scannable code (e.g., 103) to be displayed on the display screen of the consumer electronic device, wherein the scannable code is displayed based on scannable code data. In certain such embodiments, the scannable code data is Quick Response (QR) code data, and the scannable code that is displayed on the display screen of the consumer electronic device is a QR code (e.g., 103). Step 1306 involves initiating a session with the mobile phone (e.g., 106) in response to the mobile phone being used to scan the scannable code (e.g., a QR code 103) that is displayed on the display screen of the consumer electronic device (e.g., a TV 102), wherein the session is associated with the specific consumer electronic device (e.g., the TV 102_1) that had displayed the scannable code (e.g., the QR code 103_1) that was scanned using the mobile phone.

In accordance with certain embodiments, step 1304 is achieved by a content server (e.g., 112) providing the scannable code data to the consumer electronic device or to a media player that is communicatively coupled to the consumer electronic device, and the session that is established with the mobile phone at step 1306 is between the mobile phone and the content server. In certain such embodiments, the initiating the session with the mobile phone at step 1306 occurs in response to the mobile phone being used to scan the scannable code (e.g., the QR code 103_1) that is displayed on the display screen of the consumer electronic device, in response to which the content server (e.g., 112) provides the mobile phone with a link to a webpage that enables a browser (e.g., Google Chrome, Apple Safari, Mozilla Firefox, etc.) installed on the mobile phone to display the GUI.

In accordance with other embodiments, step 1304 is achieved by a content server application (e.g., 105), which can also be referred to as a host presentation application, providing the scannable code data to the consumer electronic device or to a media player that is communicatively coupled to the consumer electronic device. In certain such embodiments, the session that is established with the mobile phone at step 1306 is between the mobile phone and the content server application. In certain such embodiments, the initiating the session with the mobile phone at step 1306 occurs in response to the mobile phone being used to scan the scannable code that is displayed on the display screen of the consumer electronic device, in response to which the content server application (e.g., 105) provides the mobile phone with the link to the webpage that enables a browser installed on the mobile phone to display the GUI.

Step 1308 involves causing a graphical user interface (GUI) to be displayed on the mobile phone during the session, to thereby enable a user of the mobile phone to be able to select, via the mobile phone, which one of a plurality of options is displayed on the consumer electronic device (e.g., TV) that is on display in the retail store. The GUI, which is displayed via the browser installed on the mobile phone, can include one or more menus of options from which a user of the mobile phone can select to control what is being displayed on the display screen of the consumer electronic device. Examples of such menus were shown in and described above with reference to FIGS. 2-10. One of ordinary skill in the art reading this disclosure would appreciate that alternative and/or additional menus can be used and displayed while being within the scope of the embodiments described herein. In an embodiment, the GUI that is displayed on the mobile phone is provided to the mobile phone via one or more web page links that are provided to the mobile phone over a cellular network (e.g., 130). In an alternative embodiment, the GUI that is displayed on the mobile phone is provided to the mobile phone via one or more web page links that are provided to the mobile phone by the content presentation application.

Step 1310 involves controlling what is displayed on the consumer electronic device (e.g., the TV 102_1) that is on display in the retail store, in response to the one or more options that are selected by the user of the mobile phone using the GUI. Data indicative of which one or more options are selected by the user of the mobile phone can be provided from the mobile phone to a content server (e.g., 112) over a cellular network (e.g., 130) that provides communication capabilities for the mobile phone. In such an embodiment, content that is to be displayed on the consumer electronic device can be provided to the consumer electronic device, or a media player that is communicatively coupled to the consumer electronic device, via one or more web page links. Alternatively, data indicative of which one or more options are selected by the user of the mobile phone can be provided from the mobile phone to the content presentation application (e.g., 105). In such an embodiment, content that is to be displayed on the consumer electronic device can be provided based on image or video files that are stored in memory of consumer electronic device, or in memory of a media player that is communicatively coupled to the consumer electronic device. In other words, content can be obtained from memory of the consumer electronic device, or a media player communicatively coupled thereto, based on selections made by a user via the GUI that is displayed on the mobile phone of the user.

In accordance with certain embodiments, selection of a specific one of the options being displayed on the GUI causes information about the consumer electronic device to be sent to the user of the mobile phone via a text or email, as indicated at step 1312. Alternatively, or additionally, another one of the options, in response to being selected, causes the mobile phone to call or establish a textual chat with a representative of a manufacturer of the consumer electronic device, or with a representative of the retail store, as indicated at step 1314. In certain embodiments, steps 1312 and/or 1314 are not performed.

Still referring to FIG. 13, step 1316 involves terminating the session. In accordance with certain embodiments, the session is terminated at step 1316 after a specified amount of time since the session started, or after a specified amount of time since any one of the options was last selected via the mobile phone. The session may also be terminated in response to a user of the mobile phone selecting a specific option on the GUI, such as, but not limited to, "end control" or "end session". The session can instead be automatically terminated in response to a determination the user has left the store within which the user was located with the session was initially established. As was explained above, such a determination can be made based on and/or utilizing a localization technology, such as GPS.

The methods summarized with reference to FIG. 13 can also include additional steps. For example, in certain embodiments, wherein the consumer electronic device, or a media player that is communicatively coupled to the consumer electronic device, acts as a master device that is used to at least partially control one or more slave devices, such a method can also involve enabling the user of the mobile phone to control what is being displayed on at least one additional consumer electronic device using the GUI to thereby enable the user to make comparisons between the consumer electronic device and the at least one additional consumer electronic device. In certain such embodiments, the additional consumer electronic device(s), or media player(s) communicatively coupled thereto, will act as one or more slave devices that is/are at least partially controlled by the master device.

Additional and alternative details of the methods summarized above with reference to FIG. 13 could be appreciated from the above discussion of FIGS. 1-12.

It is noted that master and slave devices can alternatively be referred to, respectively, as primary and secondary devices, leader and follower devices, controller and agent devices, or master and minion devices, or by some other similar terms, as would be appreciated by one of ordinary skill in the art.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps described above.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

A computer program may be stored or distributed on a suitable medium, such as an optical storage medium or a solid-state medium supplied together with, or as part of, other hardware, but may also be distributed in other forms, such as via the Internet or other wired or wireless telecommunication systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and nonvolatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A method for enabling a user of a mobile phone to use the mobile phone to at least partially take control of a consumer electronic device that is on display in a retail store, to thereby enable the user of the mobile phone to learn about one or more capabilities of the consumer electronic device that is on display in the retail store, wherein the consumer electronic device includes a display screen, and wherein the consumer electronic device is not the mobile phone, the method comprising:

causing a scannable code to be displayed on the display screen of the consumer electronic device that is on display in the retail store, wherein the scannable code is displayed based on scannable code data;

initiating a session with the mobile phone in response to the mobile phone being used to scan the scannable code that is displayed on the display screen of the consumer electronic device that is on display in the retail store, wherein the session is associated with the consumer electronic device that had displayed the scannable code that was scanned using the mobile phone; and causing a graphical user interface (GUI) to be displayed on the mobile phone during the session, wherein the GUI enables the user of the mobile phone to use the mobile phone to at least partially take control of the consumer electronic device that is on display in the retail store, which includes allowing the user of the mobile phone to use the mobile phone to select which one of a plurality of options is displayed on the display screen of the consumer electronic device that is on display in the retail store, thereby enabling the user of the mobile phone to learn about one or more capabilities of the consumer electronic device that is on display in the retail store.

2. The method of claim 1, further comprising:
enabling installing of a content presentation application on the consumer electronic device or on a media player that is communicatively coupled to the consumer electronic device;
wherein the content presentation application enables the scannable code to be displayed on the display screen of the consumer electronic device.

3. The method of claim 2, wherein the content presentation application also enables the GUI to be displayed on the mobile phone during the session.

4. The method of claim 2, wherein the enabling installing of the content presentation application on the consumer electronic device or on a media player that is communicatively coupled to the consumer electronic device, comprises:
making the content presentation application available for download to the consumer electronic device or to a media player that is communicatively coupled to the consumer electronic device; or
making the content presentation application available to a vendor of the consumer electronic device or of a media player that can be communicatively coupled to the consumer electronic device, so that the content presentation application can be preinstalled by the vendor on the consumer electronic device or on a media player that can be communicatively coupled to the consumer electronic device.

5. The method of claim 1, wherein:
the causing the scannable code to be displayed on the display screen of the consumer electronic device, comprises a content server providing the scannable code data to the consumer electronic device or to a media player that is communicatively coupled to the consumer electronic device;
the session with the mobile phone is between the mobile phone and the content server; and
the initiating the session with the mobile phone in response to the mobile phone being used to scan the scannable code that is displayed on the display screen of the consumer electronic device, comprises the content server providing the mobile phone with a link to a webpage that enables a browser installed on the mobile phone to display the GUI.

6. The method of claim 1, wherein:
the causing the scannable code to be displayed on the display screen of the consumer electronic device, comprises a content presentation application generating the scannable code data and using the scannable code data to display the scannable code;
the session with the mobile phone is between the mobile phone and the content presentation application; and
the initiation the session with the mobile phone in response to the mobile phone being used to scan the scannable code that is displayed on the display screen of the consumer electronic device, comprises the content presentation application providing the mobile phone with a link to a webpage that enables a browser installed on the mobile phone to display the GUI.

7. The method of claim 1, wherein the GUI, which is displayed via a browser installed on the mobile phone, includes one or more menus of options from which a user of the mobile phone can select to control what is being displayed on the display screen of the consumer electronic device.

8. The method of claim 7, wherein a further option that can be selected via the GUI, in response to being selected, causes information about the consumer electronic device to be sent to the user of the mobile phone via a text or email.

9. The method of claim 7, wherein a further option that can be selected via the GUI, in response to being selected, causes the mobile phone to call or establish a textual chat with a representative of a manufacturer of the consumer electronic device, or with a representative of the retail store.

10. The method of claim 7, wherein during the session:
data indicative of which one or more options are selected by the user of the mobile phone is provided from the mobile phone to a content server over a cellular network that provides communication capabilities for the mobile phone;
the GUI that is displayed on the mobile phone is provided to the mobile phone via one or more web page links that are provided to the mobile phone over the cellular network; and
content that is to be displayed on the consumer electronic device is provided to the consumer electronic device, or a media player that is communicatively coupled to the consumer electronic device, via one or more web page links.

11. A method for enabling a user of a mobile phone to use the mobile phone to select what content is displayed on a display screen of a consumer electronic device that is on display in a retail store, wherein the consumer electronic device is not the mobile phone, the method comprising:
causing a scannable code to be displayed on the display screen of the consumer electronic device, wherein the scannable code is displayed based on scannable code data;
initiating a session with the mobile phone in response to the mobile phone being used to scan the scannable code that is displayed on the display screen of the consumer electronic device, wherein the session is associated with the consumer electronic device that had displayed the scannable code that was scanned using the mobile phone; and
causing a graphical user interface (GUI) to be displayed on the mobile phone during the session, wherein the GUI is displayed via a browser installed on the mobile phone, and wherein the GUI includes one or more menus of options from which a user of the mobile phone can select to control what is being displayed on the display screen of the consumer electronic device;
wherein during the session:
data indicative of which one or more options are selected by the user of the mobile phone is provided from the mobile phone to a content presentation application that is installed on the consumer electronic device or on a media player that is communicatively coupled to the consumer electronic device;
the GUI that is displayed on the mobile phone is provided to the mobile phone via one or more web page links that are provided to the mobile phone by the content presentation application; and
content that is to be displayed on the consumer electronic device is provided based on image or video files that are stored in memory of consumer electronic device, or in memory of a media player that is communicatively coupled to the consumer electronic device.

12. A method for enabling a user of a mobile phone to use the mobile phone to select what content is displayed on a display screen of a consumer electronic device that is on display in a retail store, wherein the consumer electronic device is not the mobile phone, the method comprising:
  causing a scannable code to be displayed on the display screen of the consumer electronic device, wherein the scannable code is displayed based on scannable code data:
  initiating a session with the mobile phone in response to the mobile phone being used to scan the scannable code that is displayed on the display screen of the consumer electronic device, wherein the session is associated with the consumer electronic device that had displayed the scannable code that was scanned using the mobile phone;
  causing a graphical user interface (GUI) to be displayed on the mobile phone during the session, wherein the GUI enables a user of the mobile phone to select, using the mobile phone, which one of a plurality of options is displayed on the display screen of the consumer electronic device that is on display in the retail store; and
  terminating the session after a specified amount of time since the session started, or after a specified amount of time since any one of the options was last selected via the mobile phone.

13. The method of claim 1, wherein the consumer electronic device comprises a television that is on display in the retail store.

14. The method of claim 1, wherein the scannable code data comprises Quick Response (QR) code data and the scannable code that is displayed on the display screen of the consumer electronic device comprises a QR code.

15. The method of claim 1, wherein the consumer electronic device, or a media player that is communicatively coupled to the consumer electronic device, acts as a master device that is used to at least partially control one or more slave devices, and the method further comprising:
  enabling the user of the mobile phone to control what is being displayed on at least one additional consumer electronic device using the GUI to thereby enable the user to make comparisons between the consumer electronic device and the at least one additional consumer electronic device;
  wherein the at least one additional consumer electronic device, or media player(s) communicatively coupled thereto, is/are the one or more slave devices that is/are at least partially controlled by the master device.

16. At least one non-transitory processor readable storage device having processor readable code embodied thereon, the processor readable code for programming one or more processors to perform a method for enabling a user of a mobile phone to use the mobile phone to at least partially take control of a consumer electronic device that is on display in a retail store, to thereby enable the user of the mobile phone to learn about one or more capabilities of the consumer electronic device that is on display in the retail store, wherein the consumer electronic device is not the mobile phone, the method comprising:
  causing a scannable code to be displayed on the display screen of the consumer electronic device that is on display in the retail store, wherein the scannable code is displayed based on scannable code data;
  initiating a session with the mobile phone in response to the mobile phone being used to scan the scannable code that is displayed on the display screen of the consumer electronic device that is on display in the retail store, wherein the session is associated with the consumer electronic device that had displayed the scannable code that was scanned using the mobile phone; and
  causing a graphical user interface (GUI) to be displayed on the mobile phone during the session, wherein the GUI enables the user of the mobile phone to use the mobile phone to at least partially take control of the consumer electronic device that is on display in the retail store, which includes allowing the user of the mobile phone to use the mobile phone to select which one of a plurality of options is displayed on the display screen of the consumer electronic device that is on display in the retail store, thereby enabling the user of the mobile phone to learn about one or more capabilities of the consumer electronic device that is on display in the retail store.

17. A system for enabling a user of a mobile phone to use the mobile phone to at least partially take control of a consumer electronic device that is on display in a retail store, to thereby enable the user of the mobile phone to learn about one or more capabilities of the consumer electronic device that is on display in the retail store, wherein the consumer electronic device is not the mobile phone, the system comprising:
  a media player that is communicatively coupled to the consumer electronic device via a wired and/or wireless connection, wherein the media player includes a content presentation application installed thereon;
  a content server that is communicatively coupled to the media player at least in part via the Internet;
  the media player configured to cause a scannable code to be displayed on the display screen of the consumer electronic device that is on display in the retail store, wherein the scannable code is displayed based on scannable code data that is provided to the media player by the content server;
  the content server configured to establish a session with the mobile phone in response to the mobile phone being used to scan the scannable code that is displayed on the display screen of the consumer electronic device that is on display in the retail store, wherein the session is associated with the consumer electronic device that had displayed the scannable code that was scanned using the mobile phone; and
  the content server also configured to cause a graphical user interface (GUI) to be displayed on the mobile phone during the session, wherein the GUI enables the user of the mobile phone to use the mobile phone to at least partially take control of the consumer electronic device that is on display in the retail store, which includes allowing the user of the mobile phone to use the mobile phone to select which one of a plurality of options is displayed on the display screen of the consumer electronic device that is on display in the retail store, thereby enabling the user of the mobile phone to learn about one or more capabilities of the consumer electronic device that is on display in the retail store.

18. The system of claim 17, wherein the content server is configured to cause the GUI to be displayed on the mobile phone during the session by providing the mobile phone with a link to a webpage that enables a browser installed on the mobile phone to display the GUI.

19. The system of claim 17, wherein the GUI, which is displayed via a browser installed on the mobile phone, includes one or more menus of options from which a user of the mobile phone can select to control what is being displayed on the display screen of the consumer electronic device.

20. The system of claim 17, wherein:
the content server is configured to receive data indicative of which one or more options that are selected by the user of the mobile phone over a cellular network that provides communication capabilities for the mobile phone;
the content server is configured to cause the GUI to be displayed on the mobile phone by providing the mobile phone with one or more web page links over the cellular network; and
content that is to be displayed on the consumer electronic device, in response to one or more options being selected by the user of the mobile phone via the GUI, is provided to the media player that is communicatively coupled to the consumer electronic device, via one or more further web page links.

21. A consumer electronic device, comprising:
a display screen;
memory configured to store image or video files; and
at least one processor configured to
cause a scannable code to be displayed on the display screen of the consumer electronic device;
establish a session with a mobile phone in response to the mobile phone being used to scan the scannable code that is displayed on the display screen of the consumer electronic device; and
cause a graphical user interface (GUI) to be displayed via a browser installed on the mobile phone during the session;
wherein the GUI enables a user of the mobile phone to use the mobile phone to at least partially take control of the consumer electronic device, which includes allowing the user of the mobile phone to use the mobile phone to select which one of a plurality of options is displayed on the display screen of the consumer electronic device, thereby enabling the user of the mobile phone to learn about one or more capabilities of the consumer electronic device; and
wherein during the session:
data indicative of which one or more options are selected by the user of the mobile phone is provided from the mobile phone to a content presentation application installed on the consumer electronic device; and
content that is to be displayed on the consumer electronic device is provided based on the image or video files that are stored in the memory.

22. The device of claim 21, wherein the GUI, which is displayed via the browser installed on the mobile phone, includes one or more menus of options from which a user of the mobile phone can select to control what is being displayed on the display screen of the consumer electronic device.

23. The device of claim 21, wherein during the session:
the GUI that is displayed on the mobile phone is provided to the mobile phone via one or more web page links that are provided to the mobile phone by the content presentation application.

* * * * *